Jan. 17, 1950    G. W. WELLS    2,495,084
VARIABLE STROKE PRESS

Filed Aug. 1, 1944    2 Sheets-Sheet 1

INVENTOR.
George W. Wells
BY his Atty
John H. McKenna

Patented Jan. 17, 1950

2,495,084

UNITED STATES PATENT OFFICE 2,495,084

VARIABLE STROKE PRESS

George W. Wells, Amesbury, Mass.; Boston Safe Deposit and Trust Company executor of said George W. Wells, deceased Application August 1, 1944, Serial No. 547,601

4 Claims. (Cl. 74—586)

This invention relates to improvement in presses, and more particularly to variable stroke presses having a head which is reciprocable toward and from a relatively fixed coacting member between which and the reciprocating head the work to be acted upon may be engaged.

Ordinarily such presses utilize a crank shaft for converting rotary motion of a power means into reciprocating motion of translation of the head, and it has been proposed heretofore to vary the stroke of the head as by varying the eccentricity of the crank of the crank shaft. However, this has involved making the crank in sections and any adjustment of stroke requires disconnection of a section and re-connection of it in the adjusted position. Also the prior adjustments of stroke, so far as I am aware, have changed the limit of stroke in both directions. In other words, the variation has been evenly divided between the opposite ends of the stroke so that the limit of travel of the head toward the work varies with each variation of the stroke.

It is an object of my present invention to provide a variable stroke press one limit of travel of whose reciprocating head continues the same regardless of variation in the length of stroke of the head. I employ a crank shaft for driving the head and the crank pin rotatably engages in a block which is slidable in a yoke at one end of the connecting rod whose other end is connected to the reciprocating head of the press. A wall of the yoke constitutes one limit of travel of the sliding block in the yoke, and an adjustable abutment constitutes the other limit of travel of the sliding block in the yoke, and this adjustable abutment may be adjusted to provide more or less lost motion between the crank and the yoke with resulting decrease or increase in the stroke of the head of the press.

Another object is to provide a variable stroke press, the length of stroke of which can be quickly and easily adjusted without disconnection and re-connection of parts.

A further feature is to provide means for adjusting the length of the connecting rod to thereby adjust at least one limit of travel of the head of the press.

Another object is to provide a simplified variable stroke press construction which lends itself to easy and economical assembly of parts.

It is, moreover, my purpose and object generally to improve the construction and operation of variable stroke presses.

Figure 1:
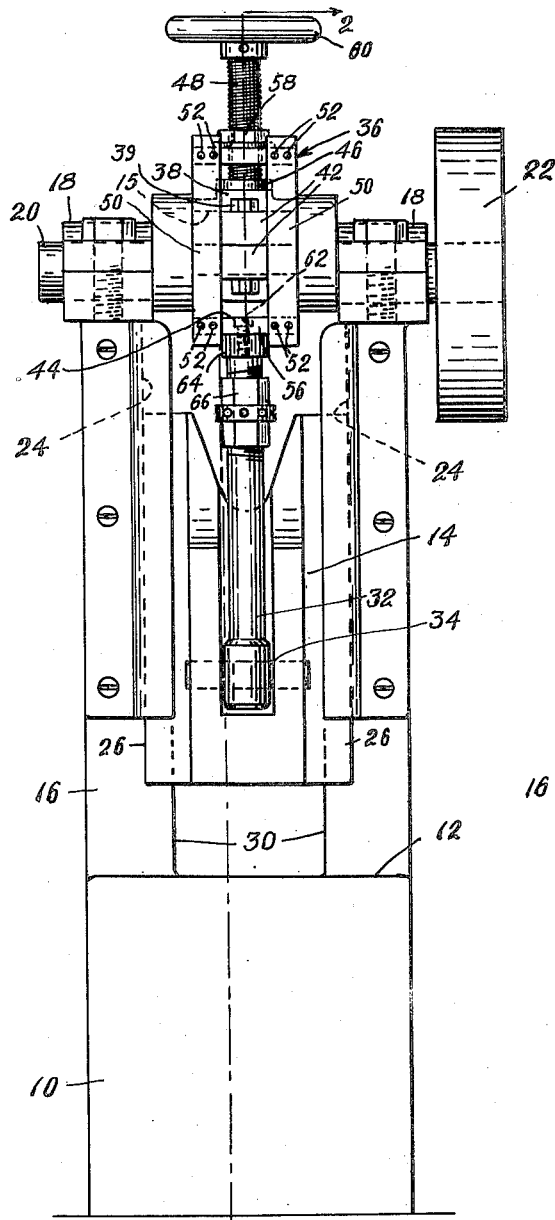
Figure 1 is a front elevation of a variable stroke press embodying features of my present invention.
Figure 2:
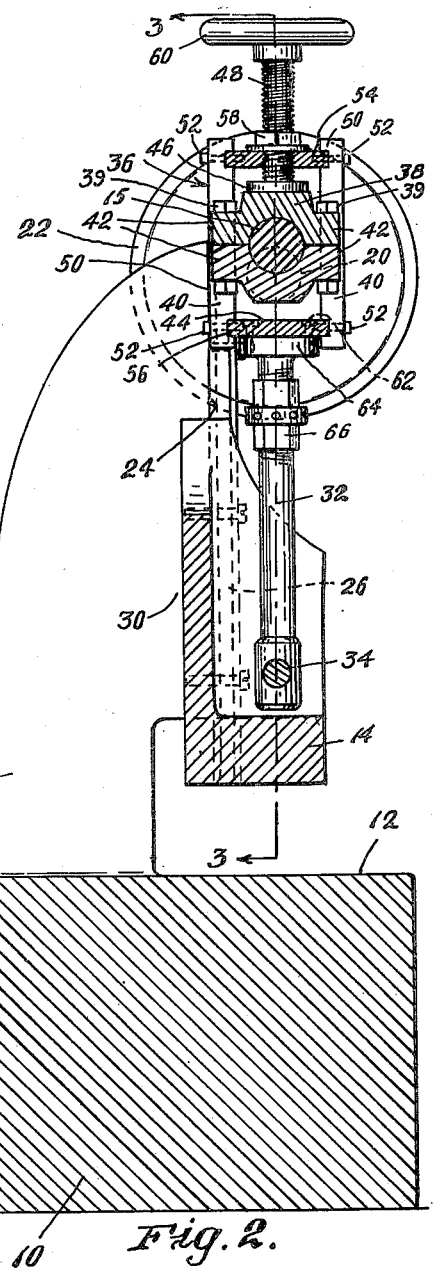
Figure 2 is an elevational view in section on line 2—2 of Figure 1.
Figure 3:
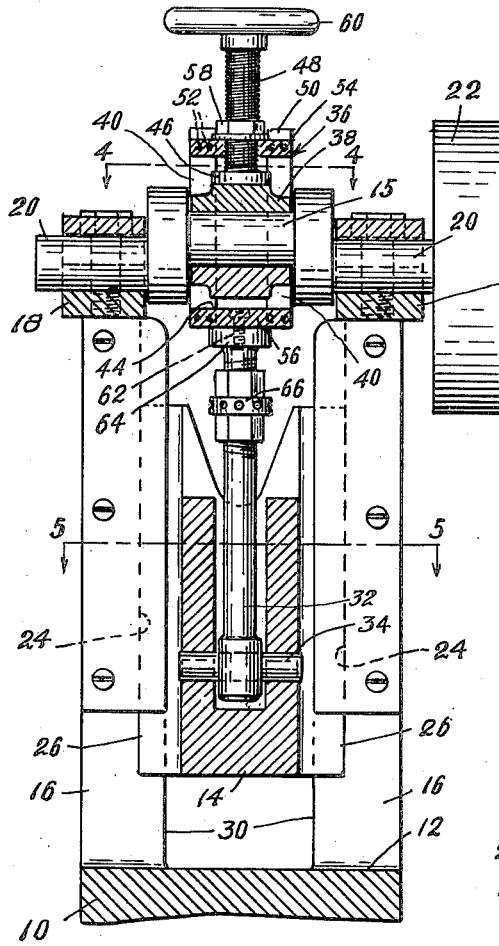
Figure 3 is a view similar to Figure 1 but in cross-section on line 3—3 of Figure 2.
Figure 4:
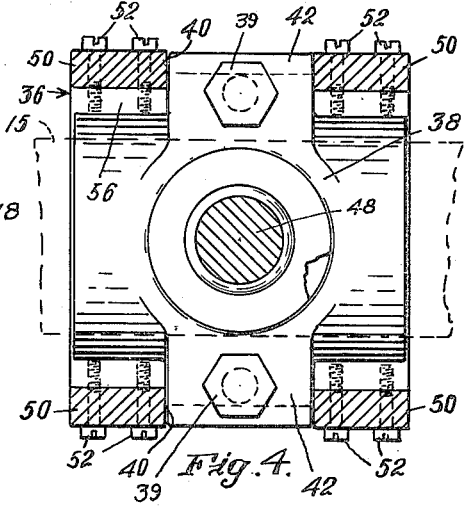
Figure 4 is a plan view in section on line 4—4 of Figure 3.
Figure 5:
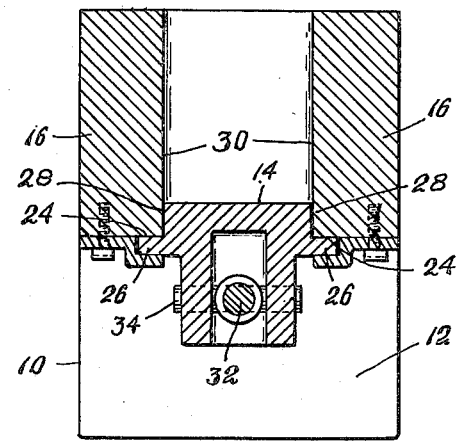
Figure 5 is a cross-sectional view on line 5—5 of Figure 3.

Referring to the drawings, the particular embodiment of my invention therein represented has a base 10 having a generally horizontal surface 12 constituting a relatively fixed work holding member or jaw of the press, on which the work may be mounted directly, or on which a suitable die or other tool may be mounted for acting on work engaged between the die or other tool or the surface 12 and the vertically reciprocating head 14 of the press.

A frame extends a substantial distance upward from the base 10, rearwardly of the press, and comprises spaced apart risers 16, 16 at whose upper ends is journalled at 18, a crank shaft 20 equipped at one end with a pulley 22 or the like by means of which power from any suitable source may be applied to the crank shaft as by a belt (not shown). The risers 16, 16 have oppositely disposed vertical grooves 24, 24 therein constituting ways along which the head 14 is movable, the head at each side having a projecting part 26 for engaging in a said groove 24, and having an adjacent plane surface 28 for riding on the inner plane surface 30 of a riser. However, any suitable means may be provided for guiding the reciprocating vertical travel of head 14 without departing from the theory and general concept of my invention as herein disclosed and more particularly as herein defined in the accompanying claims.

According to my invention, a connecting rod 32 has its lower end connected as at 34 to the head 14, and has at its other end a yoke 36 within which is slidably mounted a bearing member or block 38 whose sliding movements are in directions axially of the connecting rod 32. Conveniently, opposite side walls of the yoke 36 each may have a slot 40 therein for receiving slidably a projecting tongue or rib 42 on the bearing block 38, for retaining the block within the yoke and for guiding its sliding movements therein. The crank pin 15 of crank shaft 20 extends rotatably through the bearing block 38, and the latter can slide in the yoke between the bottom wall 44 of the yoke and an upper abutment 46 on the inner end of screw 48 which may be adjusted in yoke 36 to vary the upper limit of movement of bearing block 38 in the yoke with consequent variation of the length of stroke of head 14. Actually a lost motion is introduced, or may be introduced, and I vary the amount of the lost motion in order to vary the stroke of head 14. The maximum length of stroke of head 14 with any particular crank shaft is attained when the upper abutment 46 is adjusted downward until bearing block 38 is clamped between the bottom wall 44 and the abutment 46, eliminating all lost motion, in which case the full throw of the crank is the length of stroke of head 14. As the abutment 46 is backed away from bearing block 38, the latter block is freed for sliding movement between the bottom of the yoke and the abutment 46 in whatever position the latter may be set. Hence there is lost motion on the upstroke of head 14 while the block 38 traverses the distance between bottom wall 44 of the yoke and abutment 46, after which the head will be lifted an amount depending upon the setting of abutment 46 relative to the full throw of the crank. If the abutment 46 is adjusted upward far enough, the full throw of the crank can be accommodated entirely within the yoke and in such case the head 14 will remain stationary notwithstanding continuous rotation of the crank shaft.

In the embodiment of my invention illustrated in the drawings, the yoke 36 is made in sections to facilitate manufacture and assembly. Also bearing block 38 is shown in two sections secured together by the bolts and nuts indicated at 39. The opposite sides of the sections of block 38 have the portions 42 of reduced width which constitute the tongues or ribs previously mentioned as engaging in the slots 40 in the side walls of the yoke. These slots 40 as herein illustrated, are formed by spaced apart bars 50 secured as at 52 to upper and lower plate sections 54, 56 of yoke 36. The upper plate section 54 has a screw-threaded hole in which the screw 48 threadedly engages, with a lock nut 58 for locking the screw in any particular setting. A hand wheel 60 on the upper end of the screw facilitates manual adjustments thereof.

The lower plate section 56 of the yoke is secured by screws 62 to a flange or the like 64 on the upper end of connecting rod 32. Connecting rod 32 conveniently may be made in two sections as shown with the nut 66 connecting the threaded ends of the rod sections and providing for adjustment of the length of the connecting rod.

From the foregoing description, in connection with the drawings, it will be obvious that my improved press can have its connecting rod 32 adjusted as to length by means of nut 66 thereby to determine a lower limit of travel of head 14 which lower limit, when set, is the same regardless of variations in the length of stroke of the head. Also it will be apparent that variations in the length of stroke of head 14 quickly and effectively may be accomplished by merely backing away lock nut 58 on screw 48 and adjusting the screw in or out relative to yoke 36 to attain a desired setting of the abutment 46, after which the lock nut 58 may be tightened to maintain the screw in adjusted position.

While I have shown a crank providing only a relatively small maximum throw, it should be understood that the throw of the crank may be as large or as small as desired provided the yoke 36 coacting therewith is of size to accommodate the throw.

Furthermore, as will be obvious to those skilled in the art, the features of my present invention and disclosure may be embodied readily in existing presses whose heads are operated by crank shafts, to convert them to variable stroke presses at relatively small cost.

I claim as my invention:

1. In a press, a reciprocable head, and means for reciprocating the head comprising a crank and a connecting rod extending between the crank pin and said head, means for adjusting the length of the connecting rod while the crank pin is at rest in one on-center position, thereby to fix one limit of stroke of the head, and means at the connection of the connecting rod to the crank pin for varying the length of stroke of the head by adjusting only the other limit of the stroke.

2. In a press, a reciprocable head, a connecting rod pivotally connected at one end to the head and having a yoke at its other end, parallel guides on opposite sides of the said yoke, a crank shaft extending through said yoke, means on the crank pin slidably engaging said parallel guides of the yoke, said crank pin being rotatable in said means and said means being movable along the guides of the yoke in response to rotation of the crank shaft, and an adjustable stop in said yoke for predetermining the amount of movement of said means along the guides of said yoke and adapted also to prevent any relative movement of said means and said yoke.

3. In a press, a reciprocable head, a connecting rod pivotally connected at one end to the head and having a yoke at its other end, parallel guides on opposite sides of the said yoke, a crank shaft extending through said yoke, means on the crank pin slidably engaging said parallel guides of the yoke, said crank pin being rotatable in said means and said means being movable along the guides of the yoke in response to rotation of the crank shaft, an adjustable stop in said yoke for limiting the movement of said means in said yoke in direction away from said head thereby to predetermine one limit of travel of the head, and means for adjusting the head toward and from said yoke thereby to vary the other limit of travel of the head.

4. In a press, a reciprocable head, a connecting rod pivotally connected at one end to the head and having a yoke at its other end, said yoke having end walls spaced substantially apart along the axis of the connecting rod, and having parallel guides extending between said end walls at opposite sides of the yoke, a slide member mounted in said yoke and movable along said guides in direction axially of the connecting rod, said slide having abutment surfaces generally parallel with said end walls of the yoke, a crank shaft having its crank pin extending rotatably through said slide member, and an adjustable stop means in said yoke on that side of the slide member remote from the reciprocable head for predetermining the amount of relative movement of the yoke and slide member in response to rotation of said crank shaft.

GEORGE W. WELLS.

REFERENCES CITED

The following references are of record in the file of this patent:

UNITED STATES PATENTS

| Number | Name | Date |
|---|---|---|
| 51,267 | Raymond | Nov. 28, 1865 |
| 533,002 | Cranmer | Jan. 22, 1895 |
| 785,767 | Schoelkopf | Mar. 28, 1905 |
| 2,021,203 | Savage | Nov. 19, 1935 |
| 2,198,333 | Freeman | Apr. 23, 1940 |
| 2,214,594 | Randall | Sept. 10, 1940 |
| 2,232,180 | Kux | Feb. 18, 1941 |
| 2,271,771 | Klocke | Feb. 3, 1942 |

FOREIGN PATENTS

| Number | Country | Date |
|---|---|---|
| 9,453 | Great Britain | 1909 |
| 46,547 | Netherlands | July 15, 1937 |
| 414,690 | Great Britain | Aug. 7, 1934 |
| 459,421 | Great Britain | Jan. 7, 1937 |
| 754,757 | France | Nov. 14, 1933 |